Jan. 3, 1956     M. E. McCLELLAN     2,729,256
FORAGE HARVESTER
Filed March 13, 1953     3 Sheets-Sheet 1
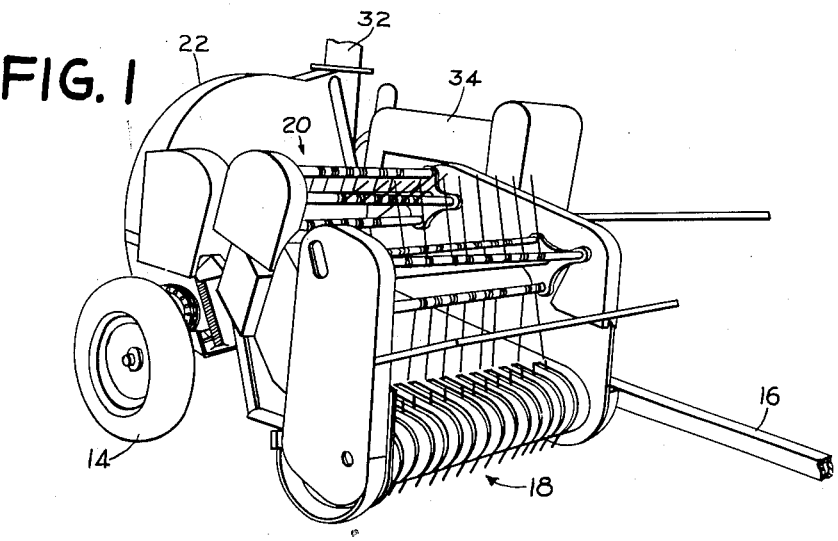
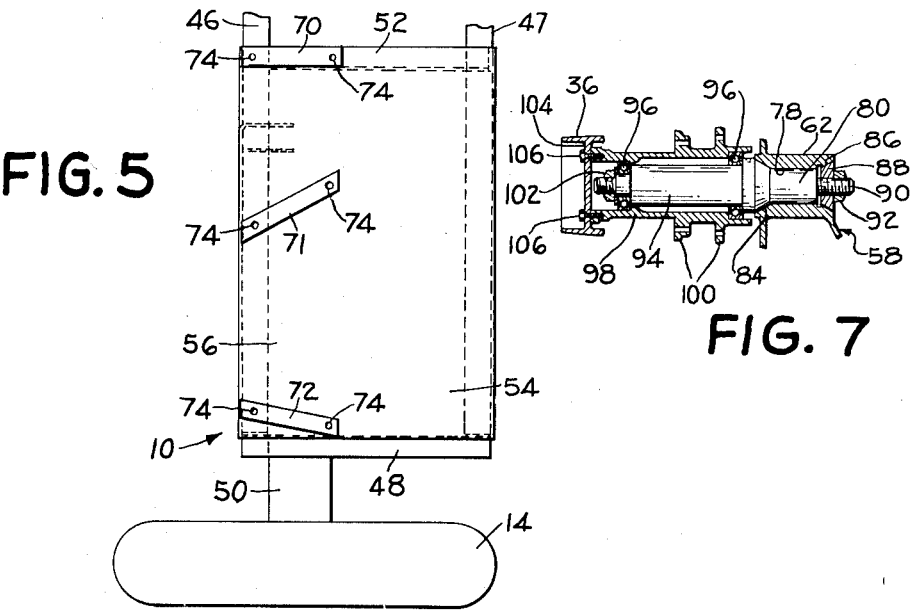
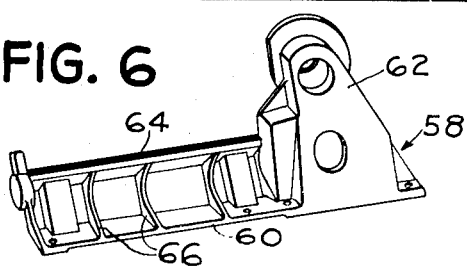
*INVENTOR.*
MARCUS E. McCLELLAN
ATTORNEYS Jan. 3, 1956　　M. E. McCLELLAN　　2,729,256
FORAGE HARVESTER
Filed March 13, 1953　　　3 Sheets-Sheet 2
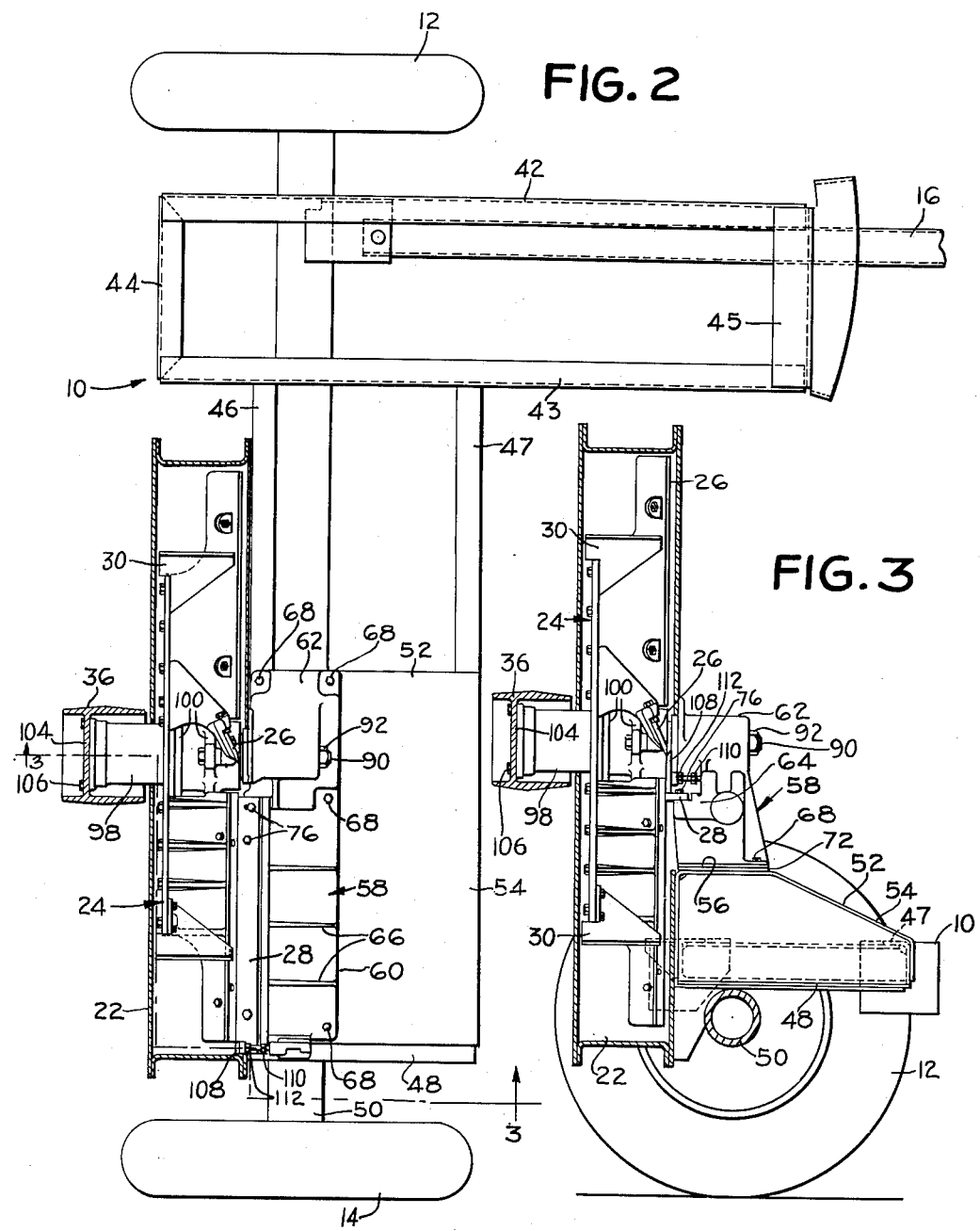
INVENTOR.
MARCUS E. McCLELLAN
ATTORNEYS Jan. 3, 1956  M. E. McCLELLAN  2,729,256
FORAGE HARVESTER Filed March 13, 1953  3 Sheets-Sheet 3

INVENTOR.
MARCUS E. McCLELLAN
BY
ATTORNEYS

United States Patent Office 2,729,256
Patented Jan. 3, 1956

2,729,256
FORAGE HARVESTER

Marcus E. McClellan, Ottumwa, Iowa, assignor to Deere Manufacturing Co., Dubuque, Iowa, a corporation of Iowa Application March 13, 1953, Serial No. 342,153

3 Claims. (Cl. 146—121)

This invention relates to a harvester and more particularly to a machine of the so-called forage harvester type, which is a mobile machine having a rotor and a fixed shear bar for chopping or reducing crops collected by the machine as it advances over a field.

A typical machine of the general character referred to comprises a main frame, normally carried on a pair of wheels and drawn by a tractor, and including a rotor housing within which is mounted a high-speed rotor equipped with a plurality of radial arms in the form of knives that cooperate with a fixed knife or shear bar for cutting hay and other forage crops into relatively short lengths. The rotor may be equipped with paddles or may otherwise generate a blowing action to serve as a blower for driving the reduced crops out of the housing for receipt by a trailing wagon or other receptacle. Such a machine may be equipped with a sickle and pick-up means for harvesting hay or it may have a row-crop attachment for operating on corn stalks or the like. In some cases, the machine may have only the pick-up mechanism and is then used to gather hay that has been previously cut. In any case, the end result is substantially the same.

The particular problem treated by the present invention is that presented by the occasional conflict heretofore encountered between the radial cutting knives and the fixed knife or shear bar. It will be appreciated that in order to accomplish a proper cutting action, the register of the rotor knives and the fixed knife must be one of relatively close tolerance, and anything that occurs to upset this register will cause the fixed and rotating knives to be deflected relative to each other, resulting in either excessive increase in tolerance, in which case the knives will not cut, or in actual conflict between the knives, in which case the rotating knives strike the fixed knife and cause considerable damage to the machine. It has been determined that deflection between the knives will occur primarily as a result of the crops themselves or as a result of deflection or distortion in the mobile frame on which the rotor and knives are carried. Distortion or deflection of the knives relative to each other as caused by the crops during the shearing action can and has been overcome by increasing the rigidity of the rotor and knife parts. However, no great strides have heretofore been taken in the direction of eliminating disadvantages reflected in operation because of distortion or flexing of the main frame. In the typical harvester, the main frame is constructed of relatively lightweight frame parts consistent with economy, strength and ease of operation. Because of the varying ground contour encountered by the machine as it advances, the frame is inherently flexible and distortable and therefore twists and weaves. Because of the rotor and knife mountings heretofore known in the art, this weaving and twisting is carried into operation of the rotor, and it is not uncommon to find a situation in which the frame twists, even though temporarily, sufficient to cause the rotating knoves to strike the fixed knife.

It will appear perfectly obvious that the disadvantage can be eliminated by reenforcing and strengthening the entire frame, but it is just as obvious that this would make the frame so heavy and so costly as to be practically worthless. According to the present invention, this serious problem is eliminated by the provision of a combined rotor and knife mounting comprising preferably a one-piece casting that is of inherently greater rigidity than the frame. The mount includes a bearing portion or journal for the rotor and in addition includes as an integral or rigid part thereof a ledge or supporting portion for the fixed knife. Since the rotor and the fixed knife or shear bar are the parts that must cooperate and since these two parts are carried by the one-piece mount, these parts are isolated from twisting, flexing or other distortion of the frame. Consequently, whatever inherent flexibility is desirable or permissible in the frame need not be carried over into the rotor and knife mounting, and the register or fixed relationship between the rotor or fixed knife or shear bar may be maintained regardless of the ground contour encountered by the machine as it operates.

Another object of the invention is to provide an improved frame of such design as to retain all the desirable lightweight characteristics but including a special supporting portion for mounting the combined rotor and knife mount, thereby enabling the production of a frame that is not materially more expensive than frames heretofore known.

The foregoing and other important objects and desirable features inherent in and encompassed by the invention will become apparent from a disclosure of a preferred form of the invention as described in the annexed specification and illustrated in the accompanying sheets of drawings.

In the drawings:

Figure 1 is a perspective view of a representative type of forage harvester.

Figure 2 is a plan view, on an enlarged scale and with certain parts omitted, of the machine shown in Figure 1.

Figure 3 is a transverse sectional view taken substantially on the line 3—3 of Figure 2.

Figure 5 is a fragmentary sectional view as seen along the line 5—5 of Figure 4.

Figure 6 is a perspective view of the combined rotor and knife support by itself.

Figure 7 is an enlarged fragmentary sectional view as seen substantially along the line 7—7 of Figure 4.

Figure 4:
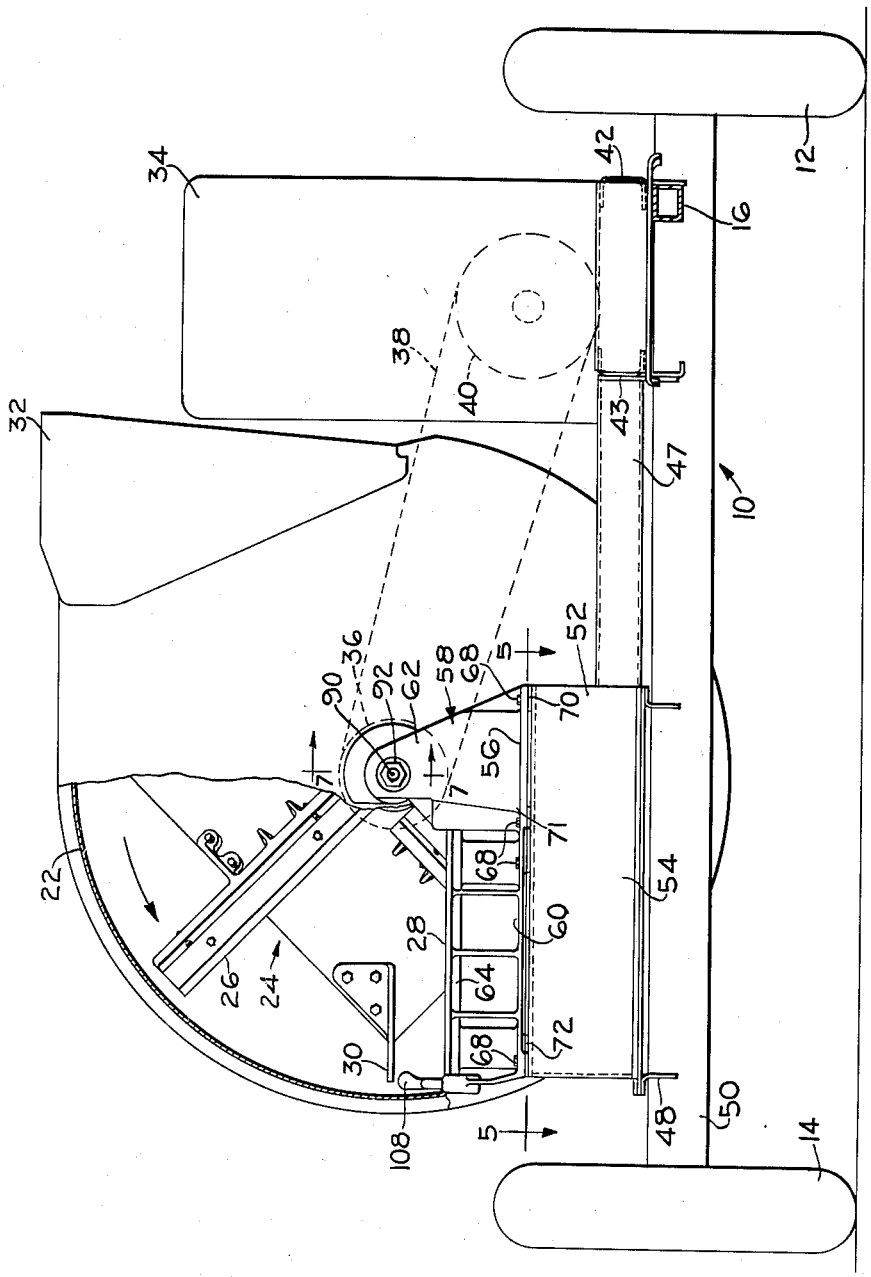
Figure 4 is a front view of the machine as it appears in Figure 2 with the draft tongue in section and part of the rotor housing broken away.

In the following description, familiarity with general principles and fundamentals of design of forage harvesters will be assumed, since such machines as a whole are old and well known. For example, reference may be had to assignee's Hill Patent 2,347,907. Accordingly, the over-all description will be somewhat general.

The machine selected for the purposes of illustration comprises a main framework 10 (Figure 2) carried on a pair of coaxial relatively widely spaced apart ground-engaging wheels 12 and 14 and equipped with hitch means in the form of a draft tongue 16 for connection to and to support on a tractor or other draft vehicle so that the machine may be advanced over a field of crops. The particular machine shown here is illustrated as having a pick-up mechanism, designated generally by the numeral 18, representative of any conventional design serving as forwardly mounted collecting means effective to pick up crops that have been previously cut. The picked up crops are fed rearwardly by mechanism including an overhead feeder 20 and other mechanism including feed rolls (not shown) to a rotor housing or crop-reduction means 22, wherein the crops are chopped up or reduced by the cooperative action of a high-speed rotor 24, equipped with a plurality of radial blades or knives 26 and a fixed shear bar or stationary knife 28. As will be seen, the reduction means is at the rear of the harvester and thus longitudinally relatively remote from the connection of the hitch means to the tractor. The rotor may include a plurality of circumferentially spaced paddles 30 whereby the rotor serves as a blower for discharging reduced material tangentially upwardly and outwardly through a discharge duct 32, none of which is unconventional. Some machines of this type are driven from the power take-off shaft of the tractor, while others have their own power plants. The machine illustrated is of the latter type, having an internal combustion engine, designated generally by the numeral 34, furnishing power for rotating the rotor 24. As will be brought out below in greater detail, the rotor 24 is equipped with a belt pulley 36 about which is looped a flat driving belt 38, the other end of the belt being looped about a driving pulley 40 driven by the engine 34.

As best seen in Figure 2, the main frame 10 is of generally lightweight construction, being made up in part of a plurality of somewhat elongated pieces in the form of angles 42 and 43 joined at their front and rear ends by relatively short transverse angles 44 and 45, these four pieces making up a rectangular subframework serving as a mount for the engine 34. Other pieces of the framework include transversely elongated cross members 46 and 47 rigidly joined at their left-hand ends to the longitudinal frame piece 43 and cross connected at their right-hand ends by a short longitudinal frame piece or angle 48. The entire framework is supported on an elongated transverse axle 50, at opposite ends of which are journaled the wheels 12 and 14. From the description of the frame thus far, it will be seen that the framework is relatively lightweight which is consistent with economy in construction and ease in operation, since its draft is light and it is fairly adequate for the general purposes intended. However, the right-hand side portion of the frame is of more rigid construction, comprising a support or platform 52 of relatively heavy gauge metal shaped to produce the box section apparent in Figure 3.

The platform or support 52 has a forwardly and downwardly inclined portion 54 which may serve in any appropriate manner for the mounting of the pick-up 18 and parts associated therewith. The platform also has an upper horizontal portion 56 which serves the important function of carrying a combined rotor and knife support, designated generally by the numeral 58.

This mount comprises a single one-piece element in the form of a casting having a base 60, an upstanding bearing portion or journal 62 at one end thereof and a radial supporting portion or ledge 64 projecting from the bearing portion 62. The ledge is appropriately reenforced and its rigidity increased relative to the remainder of the element by a plurality of ribs 66. The element as such is substantially incapable of flexibility when subjected to forces of the magnitude experienced in the operation of the machine. The means for affixing the element 58 to the frame 10 via the element base 60 and the frame platform or support 52 comprises a plurality of cap screws 68. As shown in Figure 5, the upper horizontal portion 56 of the platform or support 52 has rigidly welded thereto a plurality of strips 70, 71 and 72, each of which has a pair of tapped bores 74 therein for receiving the cap screws 68. It will be seen that the total area of the base 60 of the element 58 is but a fraction of the total area of the frame 10 and that the points of contact between the element and the frame are but few. Since the element 58 is self-contained and rigid in its own right, it will not, even though affixed to the frame, be affected by flexing, weaving, twisting, etc. of the frame. In other words, the element 58 is isolated from flexing or distortion of the frame.

The integral or rigidly united ledge or knife-supporting portion 64 of the element 58 extends horizontally outwardly from the upstanding journal portion 62 and serves as a flat bed for the mounting of the shear bar or fixed knife 28. Cap screws 76 may be used to secure the knife to the ledge. As long as these cap screws are tight, the knife becomes in effect an integral part of the ledge 64 which is in turn an integral part of the casting or element 58. As such, the knife is then isolated from flexing or distortion of the frame 10.

It will be noted at this point, and repeated later, no attempt is made to rigidify the entire frame against flexibility, since some flexibility or distortion is desired. Instead, the invention aims at isolating important parts from the flexing or distortion so that the flexing is not reflected in the operation of parts in which relative displacement is undesirable.

As best seen in Figure 7, the journal or bearing portion 62 of the element 58 is hollow or otherwise formed to provide a socket 78 within which is rigidly received one end of a supporting shaft 80. This shaft has an annular conical portion 82 received in a complementary recess 84 in the mouth of the socket 78 and the other end of the socket 78 has a conical recess 86 for receiving a plug 88 through which a reduced threaded portion 90 of the shaft 80 passes to receive a nut 92. Tightening of the nut locks the shaft 80 into the socket 78 and the shaft in effect becomes a part of the element 58.

The shaft is of substantial section, as seen, and projects rearwardly from the element 58 as a spindle 94 for journaling the rotor 24 on a pair of axially spaced bearings 96, these bearings being contained in a rotor hub 98 which is flanged at 100 to carry various components of the rotor. The rotor is retained on the spindle 94 by any appropriate means such as a lock nut 102. The belt pulley 36 has an interior radial web 104 which is secured by cap screws 106 to the rotor hub 98. The bearings 96 are of the precision type and the rotor itself is of rigid heavy construction. Thus, variations are held to a minimum and tolerances in the register of the rotor knives 26 with the fixed knife 28 are held to a minimum. Because of the mass and strength of the parts used, there can be theoretically no deflection between the rotor and the rotor support 58; consequently, there will be no deflection or miss-register between the rotor knives and the fixed knife or shear bar 28.

Because the free or outer radial ends of the rotor knives 26 are not as rigidly supported as inner portions, it is expedient to utilize a knife guide, here designated generally by the numeral 108. This knife guide is carried by the ledge 64 by means of a screw member 110 having opposite right- and left-hand threaded ends, whereby the knife guide may be adjusted back and forth relative to the element 58. As best seen in Figure 3, the shape of the knife guide is such as to prevent the free or outer ends of the rotor knives 26 from climbing the stationary knife or shear bar 28. A lock nut 112 is provided for locking the adjusted knife guide against loosening.

Various specific features of the invention not categorically enumerated will undoubtedly occur to those versed in the art, as will many modifications and alterations in the preferred embodiment of the invention illustrated, all of which may be accomplished without departing from the spirit and scope of the invention.

What is claimed is:

1. A mobile harvester having a main frame supported on a pair of ground-engaging wheels spaced relatively widely apart transverse to the line of advance and carrying adjacent to the wheels a crop-reduction means of the type including a frame-supported rotor having radial knives cooperative with a generally radial frame-supported shear bar, a frame-mounted crop-collecting means ahead of and delivering rearwardly to the reduction means, and hitch means on the frame adapted for connection to and support on a power vehicle in longitudinally remote relation to the reduction means for vehicle-powered advance of the harvester over a field of crops to perform a combined crop-collecting and crop-reduction operation, said harvester characterized in that the frame is inherently relatively flexible for flexing and return to normal as the ground wheels encounter varying ground contour during advance over the field, and said harvester being further characterized by a combined rotor and shear bar mount of rigid, self-contained construction having a frame-engaging area only a fraction of the size of the harvester frame and including means for affixing the mount to the frame solely in said area so as to isolate the mount from flexing of the frame; said mount including at one end thereof a rigidly included journal portion serving as the sole means for journaling the rotor and a supporting portion rigid therewith and extending radially from the journal portion alongside the rotational plane of the rotor knives and serving as the sole means for carrying the shear bar in cooperative relation to the rotor knives; said journal and supporting portions being free from shock- and force-transmitting connections to the frame except as said portions are parts of the mount, whereby a fixed relationship between the rotor knives and the shear bar exists unaffected by flexing of the frame.

2. The invention defined in claim 1, further characterized in that the rotor includes a central support plate and the rotor knives respectively have outer end portions projecting radially beyond said plate, and the rigid supporting portion of the mount includes a knife guide thereon in the zone of the circular path traveled by the outer end portions of the knives as the rotor rotates, said guide being closely adjacent to the rotational plane of the rotor knives and inclining upwardly from the shear bar and forwardly from said rotational plane to serve to deflect the outer end portions of the rotor knives back to said rotational plane.

3. A mobile harvester having a main frame supported on a pair of ground-engaging wheels spaced relatively widely apart transverse to the line of advance and carrying adjacent to the wheels a crop-reduction means of the type including a frame-supported rotor having radial knives cooperative with a generally radial frame-supported shear bar, a frame-mounted crop-collecting means ahead of and delivering rearwardly to the reduction means, and hitch means on the frame adapted for connection to and support on a power vehicle in longitudinally remote relation to the reduction means for vehicle-powered advance of the harvester over a field of crops to perform a combined crop-collecting and crop-reduction operation, said harvester characterized in that the frame is inherently relatively flexible for flexing and return to normal as the ground wheels encounter varying ground contour during advance over the field, and said harvester being further characterized by a combined rotor and shear bar mount comprising a rigid, one-piece casting having a frame-engaging base including means for the removable affixation to the frame, an integral upstanding bearing portion at one end of said base and serving as the sole means for journaling the rotor, and an integral ledge above the base and extending radially from the bearing portion alongside the rotational plane of the rotor knives and serving as the sole means for carrying the shear bar in its cooperative relationship to the rotor knives; said base terminating at one end substantially below the bearing portion and terminating at its other end substantially below the radially outermost end of the shear bar whereby to minimize the area of contact of the base with the frame; and said base serving as the sole intervening connection between the frame and the ledge and the frame and the bearing portion so that said ledge and bearing portion are isolated from flexing of the frame.

References Cited in the file of this patent
UNITED STATES PATENTS

| | | |
|---|---|---|
| 1,115,883 | Youmans | Nov. 3, 1914 |
| 1,173,238 | Youmans | Feb. 29, 1916 |
| 1,363,445 | Virtue | Dec. 28, 1920 |